Feb. 21, 1933.    H. L. DOHERTY    1,898,246
APPARATUS FOR DISTILLING OILS
Original Filed Feb. 4, 1920    5 Sheets-Sheet 1

Fig.1.

Feb. 21, 1933. H. L. DOHERTY 1,898,246
APPARATUS FOR DISTILLING OILS
Original Filed Feb. 4, 1920 5 Sheets-Sheet 3

Attorney
Edmund G. Borden

Inventor
Henry L. Doherty

Patented Feb. 21, 1933

1,898,246

UNITED STATES PATENT OFFICE

HENRY L. DOHERTY, OF NEW YORK, N. Y., ASSIGNOR, BY MESNE ASSIGNMENTS, TO HEAT TREATING COMPANY, OF NEW YORK, N. Y., A CORPORATION OF DELAWARE

APPARATUS FOR DISTILLING OILS

Original application filed February 4, 1920, Serial No. 356,263. Divided and this application filed July 7, 1920. Serial No. 394,489.

This invention relates to an apparatus for refining liquids and more particularly to an apparatus for distilling petroleum or mixtures of hydrocarbon oils to separate them into their several constituents or to obtain a desired product by the decomposition or cracking of a hydrocarbon oil.

Crude petroleum and the crude product of the destructive distillation of heavy oils consist of mixtures, in varying proportions, of a series of hydrocarbons ranging from light, volatile members to heavy, pitch like substances, which are solid or semi-solid at ordinary temperatures. When a liquid mixture of this type is distilled, the lighter members are first vaporized and the mixture begins to boil at approximately the boiling point of the lightest members. As the distillation is continued and the mixture becomes poorer in the lighter constituents, the temperature of the boiling liquid gradually rises and the vapors given off contain less of the lighter and more of the heavier constituents until the heaviest hydrocarbons which it is practicable to distill are vaporized. The vapor given off at any temperature during distillation may have a definite boiling point and composition, but the composition of the mixture changes constantly as the temperature rises. A rough separation of the original mixture into its constituents to produce kerosene, gasoline, naphtha and other products, may be obtained by continuously condensing the vapors formed and separately collecting the condensates produced between definite boiling point limits. Since the change in the character of the vapors is gradual, the products thus obtained not only do not have a definite boiling point but the boiling point varies over a comparatively wide range. Any given fraction will, moreover, contain a considerable amount of constituents belonging to neighboring fractions. To obtain a commercial product of definite composition and boiling point, the various fractions must be redistilled to free them of undesirable compounds, thereby entailing additional losses and requiring additional quantities of heat and several distillations of the products.

A sharp separation of the lighter from the heavier hydrocarbons is particularly desirable in the case of the products formed in the cracking of oils, since the heavy constituents are usually returned to the still and again submitted to the cracking operation. The heating of the oil in the cracking operation tends to break down all of the hydrocarbons to lighter products and to break up the lighter members to permanent gas and carbon. The return of any of the lighter members to the cracking still, therefore, tends to unnecessarily increase the production of permanent gases and to correspondingly decrease the yield of the desired products.

In distilling processes generally, and especially in oil cracking processes, a uniform heating and accurate control of the temperature of the liquid is desirable. If the temperature throughout any part of the distilling apparatus is not uniform, the operation in the corresponding step of the process will vary and will interfere with the normal operation of the process. For instance, in cracking hydrocarbon oils, the character of the reaction and of the reaction products varies with changes in the temperature at which the reaction is carried on, a high temperature tending towards the formation of permanent gases. If, therefore, the transmission of heat to the oil be accompanied with the establishment of a temperature gradient or variation in temperature in the oil, or if the temperature of the oil be not closely controlled, the conditions most favorable to the production of the desired product may not be obtained, and the yield or efficiency of the process will accordingly be reduced through the formation of excessive amounts of gases and other undesirable products.

The object of the invention is, therefore, to provide an apparatus for refining liquids by which the liquid to be treated may be separated directly into fractions having boiling points lying within narrow and sharply defined temperature limits.

Another object of the invention is to provide a distilling apparatus in which a mixture of oils may be continuously separated by a single treatment directly into fractions of definite and substantially constant boiling point limits and substantially free of constituents having boiling points outside the boiling point limits of the fractions.

A further object of the invention is to provide an apparatus by which heavy hydrocarbon oils may be continuously decomposed into lighter hydrocarbons and the lighter hydrocarbons thus formed may be separated directly into fractions having sharply defined boiling point limits.

A further object of the invention is to provide an apparatus for distilling liquids in which a uniform temperature may be maintained throughout any portion of the liquid being treated and by which this temperature may be readily and accurately controlled.

With these and other objects in view, the invention consists in the apparatus described in the following specification and defined in the claims.

The various features of the invention are shown in the accompanying drawings; in which.

The present invention is a division of my pending application, Serial No. 356,263, filed February 4, 1920, for a process of distilling oils.

In the process covered by the above mentioned application, the oil to be treated is passed downwardly through a series of fractionating chambers and is heated to progressively higher temperatures by means of a heated gas passing through the chambers countercurrent to the flow of the oil. The gas is passed through each chamber in a large number of streams of bubbles thereby agitating the oil and effecting an intimate contact between every portion of gas and oil. In this manner the oil is heated to a uniform temperature in each chamber and the temperature may be accurately controlled by controlling the temperature and quantity of gas supplied. The oil is finally brought to a temperature at which it is broken up or cracked into lighter constituents which are absorbed and removed by the upwardly passing stream of gas. From the finer oil heater, the residue of oil which remains undecomposed, together with tar and carbon formed by decomposition of the oil, flow through a series of heat recovery chambers in which it is cooled to progressively lower temperatures by means of cold gas passing countercurrent to the passage of the oil residue and is finally brought to substantially atmospheric temperature.

The gas in passing through the heat recovery chambers abstracts heat from the oil residue and is heated to a progressively higher temperature. The heated gas is withdrawn from the hottest of the heat recovery chambers and is heated directly by means of a gas flame or other heating means, to a temperature above that at which the oil is decomposed or cracked. From the gas heater the gas passes directly into contact with the hottest body of oil to be treated and passes successively upwardly through each body of oil in the series of fractionating chambers.

In passing countercurrent to the passage of the oil, the gas is first brought into a heat interchanging relation with each body of oil before coming into direct contact therewith, in such a manner that any hydrocarbons which are condensable at the temperature of the oil will be condensed and removed before passing into the body of oil. The gas is then bubbled directly through the bodies of oil. By this treatment the hydrocarbons in the oil vapors are separated into a number of sharply defined fractions and any light hydrocarbons are effectively removed from the oil undergoing treatment before it reaches the cracking zone. From the uppermost of the bodies of oil, the gas is taken through a water cooled condenser to remove the last traces of condensable vapors and is returned to the heat interchangers to be recirculated through the apparatus.

Referring to the accompanying drawings, the oil to be treated is withdrawn from an oil supply cistern 10 through a pipe 12 and forced by means of a pump 14 (Figs. 2 and 3) through a pipe 16 to the uppermost of a series of fractionating chambers 18, 20, 22, 24, 26, 28, 30, 32 and 34. The oil passes from one chamber into the next lower one through a series of overflow pipes 36, 38, 40, 42, 44, 46, 48 and 50, the overflow pipes being so arranged that each chamber will be filled with oil to the level of the inlet to the corresponding overflow pipe. From the lowermost chamber 34, the oil flows through an overflow pipe 52 (Fig. 2) to a cracking chamber or still 54 in which it comes directly into contact with gas composed of light or non-condensible hydrocarbons at the highest temperature and is heated to, and maintained at, a temperature at which the oil is cracked or decomposed. With certain characters of oil and under some temperature and pressure conditions the cracking reaction may begin and a portion of the oils be cracked in the chambers 34, 32 and 30.

The hot tar and other residues produced by the cracking reaction flow from the cracking chamber or still 54 through an overflow pipe 56 to the uppermost of a series of heat recovery or heat-transforming chambers 58, 60, 62, 64, 66 and 68 (Figs. 1 and 2) passing from one chamber to the next lower through a series of overflow pipes 70, 72, 74, 76 and 78. From the lowermost chamber 68, the oil leaves the apparatus through an overflow pipe 80 and a trap 82 from which it may be discharged into the sump 10 or sent through a pipe 83 to storage. In passing downwardly through the heat transferring chambers 58 to 68, the oil is cooled to progressively lower temperatures by means of cold gas which is forced into the lowermost chamber 68 and passes upwardly, countercurrent to the oil, from one chamber to the next through a series of pipes 84, 86, 88, 90 and 92. The gas is heated by contact with the hot oil residues to progressively higher temperatures as it passes upwardly through the heat transferring chambers. The heated gas passes from the uppermost chamber 58 through a pipe 94 into an upright liquid separating pipe 96 (Fig. 1) in which any entrained liquid is separated from the gas and removed through a draw-off valve 98. The gas is thereupon heated in a furnace 100 to a temperature sufficient to cause the cracking of oil in the cracking chamber 54.

Figure 1:
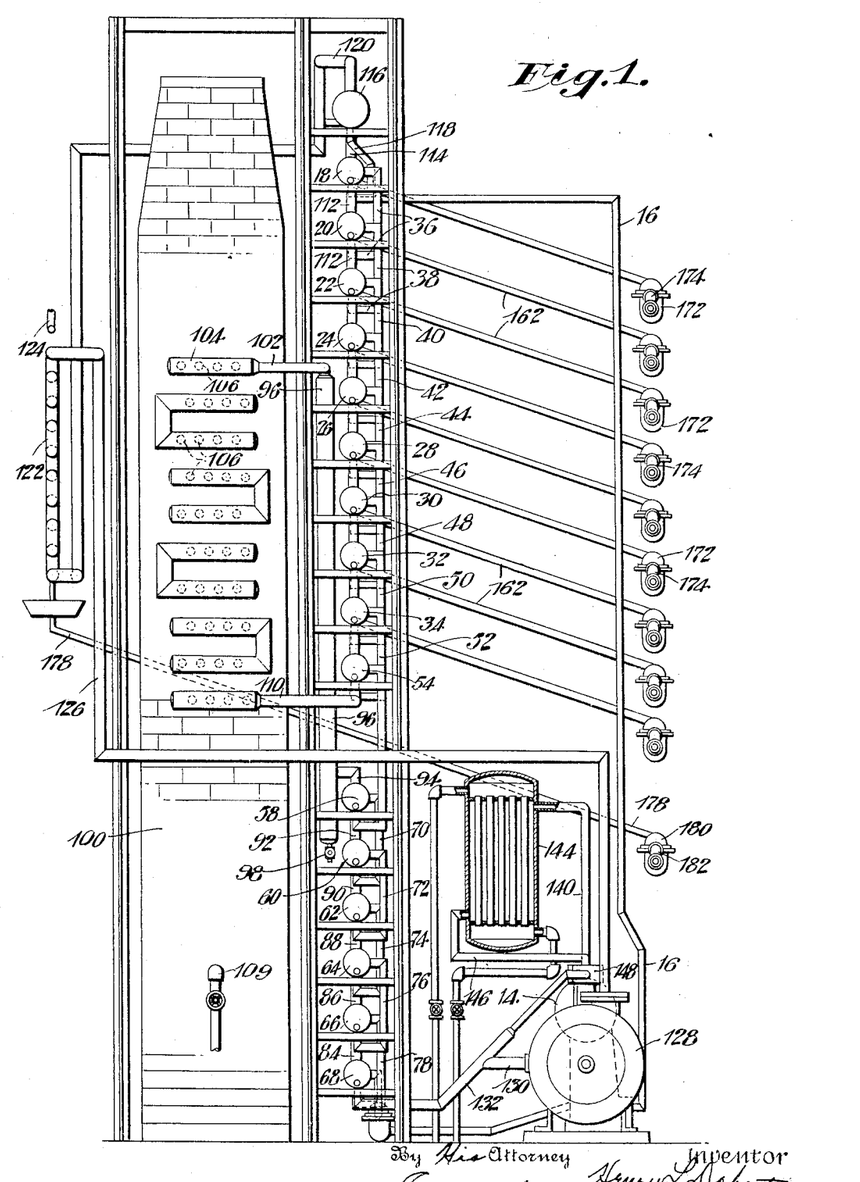
Fig. 1 is a side elevation of a still embodying the preferred form of the invention.
Figure 2:
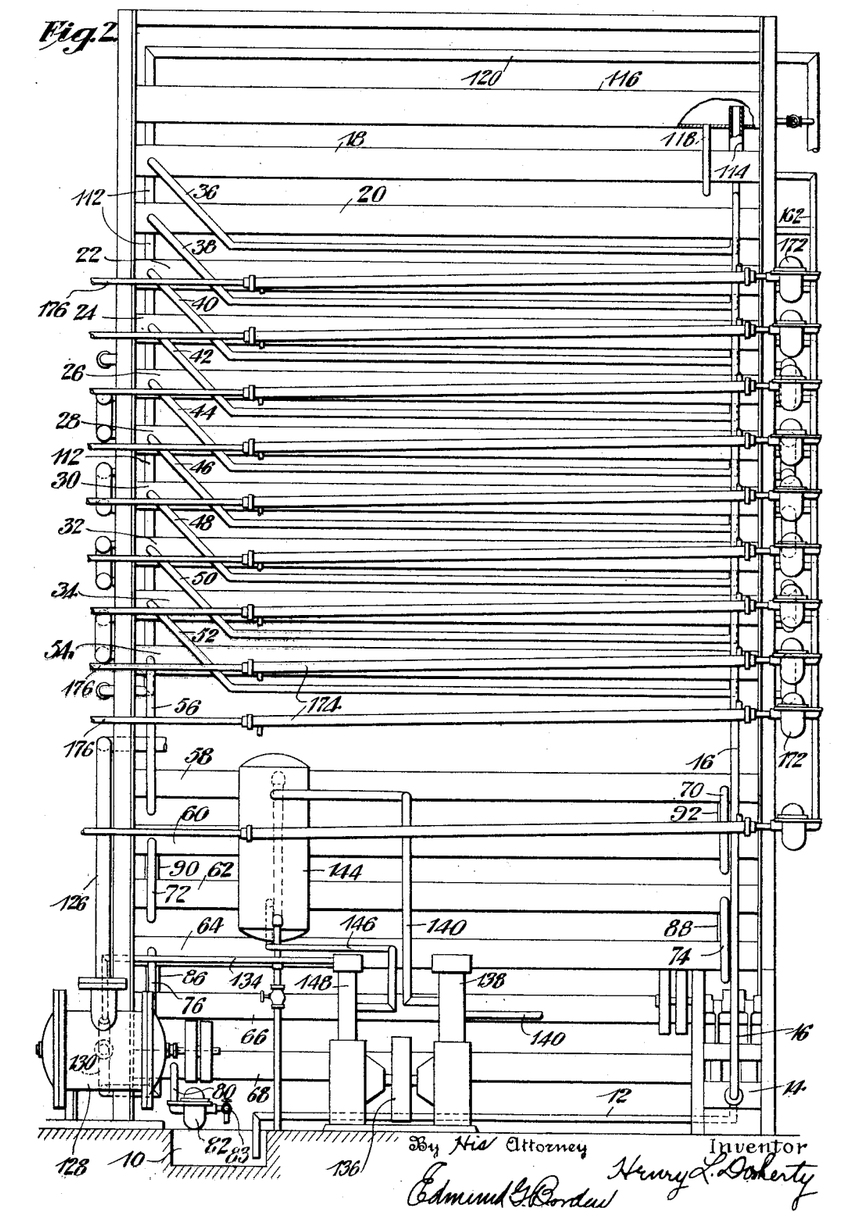
Fig. 2 is a front elevation of the still shown in Fig. 1.
Figure 3:
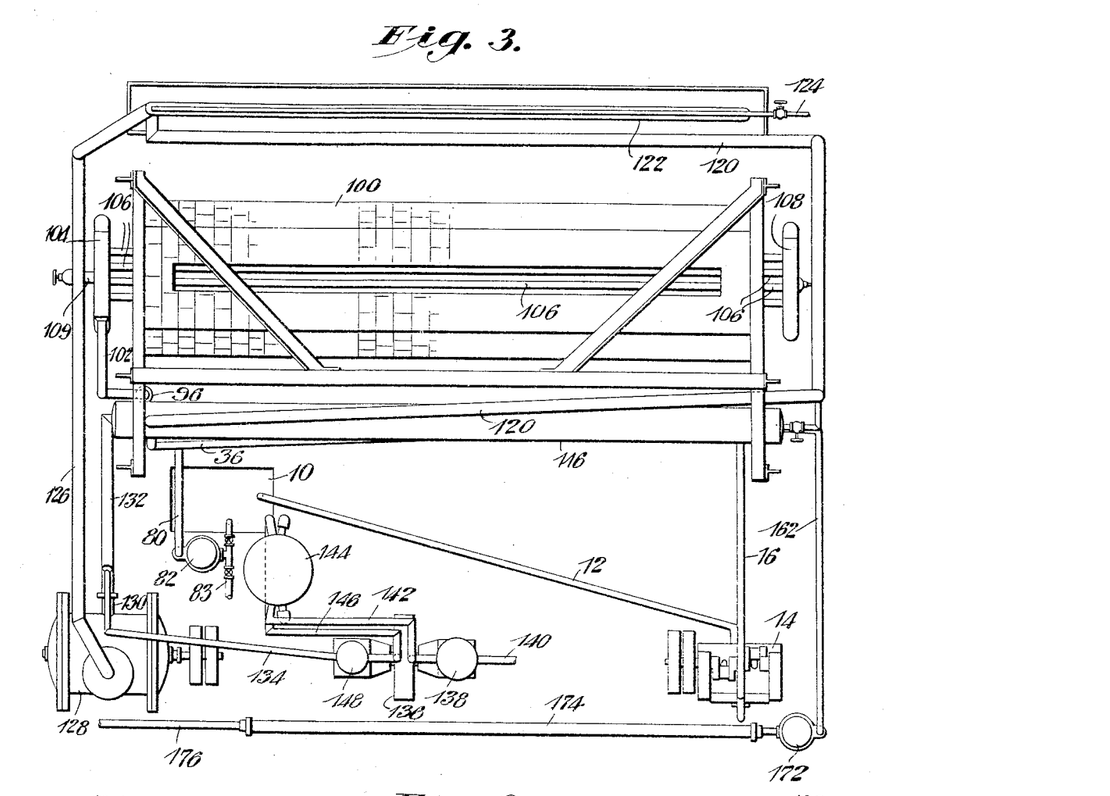
Fig. 3 is a plan view of the still shown in Figs. 1 and 2.

In heating the gas in the furnace 100 the gas is passed back and forth through a series of heating tubes extending through the furnace and connected by series of manifolds positioned outside of the walls of the furnace. The gas to be heated is conducted from the liquid separating pipe 96 through a connecting pipe 102 to the uppermost of a series of manifolds 104 at one side of the furnace (Figs. 1, 2 and 3). The manifolds 104 communicate, through a number of heating pipes 106 extending through the furnace, with a series of similar manifolds 108 on the opposite side of the furnace in such a manner as to cause the gas to pass back and forth in succession through the manifolds 104, heating pipes 106, and manifolds 108 to the lowermost of the manifolds 104. The gas in its passage through the pipes 106 is heated by the flame from a gas burner 109 to a temperature above that required to crack the hydrocarbon oils undergoing treatment and is then conducted through a connecting pipe 110 directly to the cracking chamber 54.

Figures 4, 5:
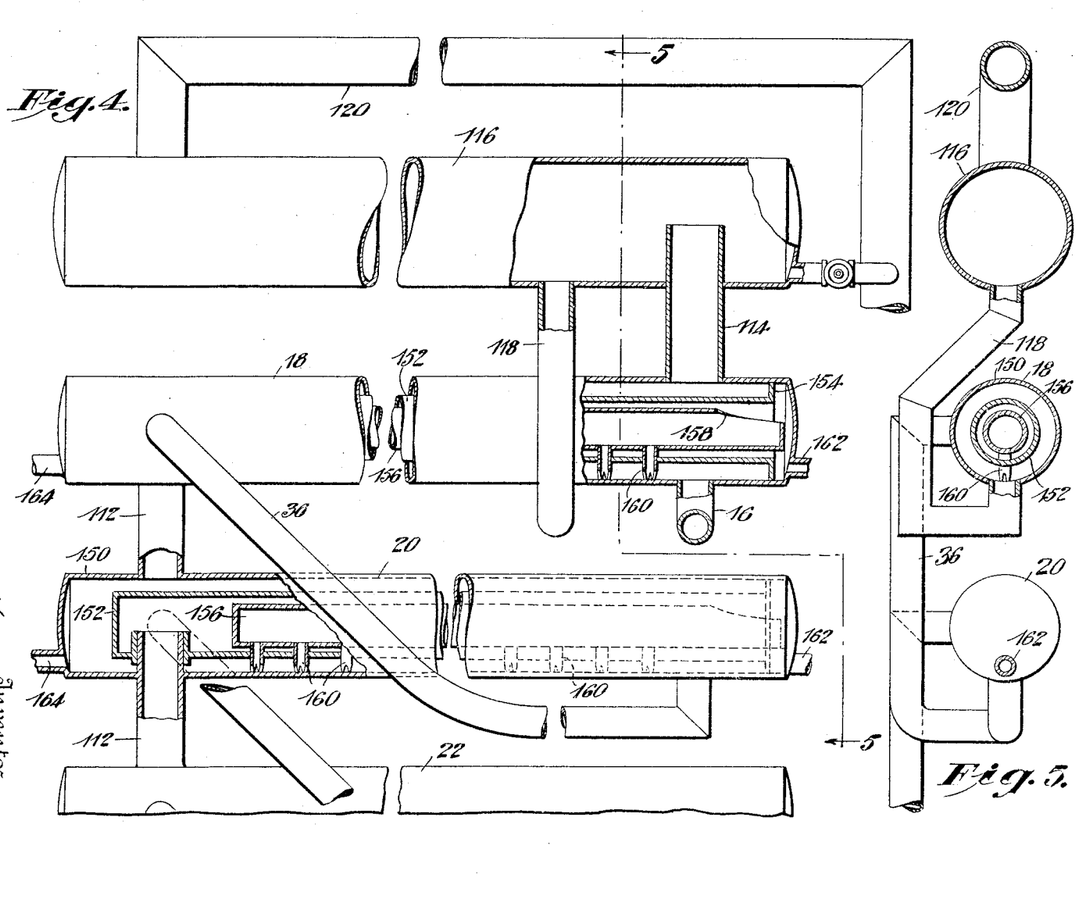
Fig. 4 is a detailed front elevation of fractionating elements of the apparatus shown in Fig. 1, parts being broken away to illustrate the interior construction.
Fig. 5 is a side elevation, partly in section of the condensing elements shown in Fig. 4.

In the cracking chamber 54 the gas is brought into intimate contact with oil which has been heated in its passage through the condenser heaters 18 to 34. From the cracking chamber the gas passes successively through the fractionating chambers 34 to 18, passing from one chamber to the next by means of connecting pipes 112 (Figs. 2 and 4). The cracking of the oil may be continued and completed in the chambers 30, 32 and 34 as these chambers are at about the same temperature as the cracking chamber 54, and they may therefore be included in the "cracking zone."

In passing upwardly through the fractionating chambers, the gas imparts its heat to the downwardly passing oil and is cooled to progressively lower temperatures. After passing through the uppermost fractionating chamber 18, the gas is conducted through a vapor pipe 114 (Figs. 2 and 4) to a foam collecting chamber 116 in which any foam or entrained liquid may be separated from the gas and returned to the chamber 18 through a return pipe 118. The gas is withdrawn from the foam chamber 116 through a vapor pipe 120 to a series of coils 122 and cooled by means of a spray of water from a water distributing pipe 124. From the condenser coils 122, the gas is withdrawn through a pipe 126 to a pressure blower 128 and returned through pipes 130 and 132 to the lowermost heat interchanger 68.

Any loss in the quantity of circulating gas, either by combination or union with the products of distillation or through a leakage from the apparatus, is replaced by a supply of additional gas from a supply pipe 134 (Fig. 3). The gas in the pipe 134 is held under a pressure slightly above the pressure maintained in the cracking still by means of a two-stage compressor 136. To this end, gas from an external source is led into a low pressure cylinder 138 of the compressor 136 through a pipe 140 and forced through a pipe 142 to a cooler 144 which may be of the multitubular type. From the cooler 144 the gas is returned through a pipe 146 to the second cylinder 148 of the compressor 136 and forced through the pressure pipe 134 to a gas inlet pipe 132 leading to the lowermost heat interchanger 68.

The construction of the fractionating chambers 18 to 34 and cracking chamber 54 is illustrated in detail in Figs. 4 and 5 of the drawings. Each chamber comprises a cylindrical outer shell 150 through which the gas inlet pipe 112 passes and an interior cylinder 152 into which the pipe 112 leads. The end of the cylinder 152 adjacent the inlet pipe 112 is closed and communication between the interior of the cylinder and the interior of the shell 150 at the other end of the cylinder is closed by means of a flange 154 formed on the cylinder and extending to the wall of the shell. A second, closed cylinder 156 is positioned within the cylinder 152 in such a manner as to form an annular passage therewith and is provided with an opening 158 at the end opposite the inlet pipe 112. The gas entering the cylinder 152 through the pipe 112 is thereby caused to pass through the annular space between the cylinders 152 and 156 to the opening 158, bringing every part of the vapor into intimate contact with the walls of the cylinder 152 to obtain a rapid and effective equalization of temperature between the condensing vapors on the inside of the cylinder 152 and the cooler body of oil within the shell 150. After passing through the annular space between the cylinders 152 and 156, the gas enters the cylinder 156 through the opening 158 and is bubbled directly through the oil in the shell 150. The gas is distributed throughout the oil in the shell 150 through a number of short pipes or nozzles 160 extending from the cylinder 156 through the cylinder 152 to the bottom of the shell 150 and provided with a number of distributing serrations or notches at their lower ends. The gas, in bubbling upwardly through the body of liquid in the shell 150, causes a rapid circulation of the oil, continually bringing fresh portions of oil into contact with the outer wall of the cylinder 152 and equalizing the temperature throughout the body of the oil. The contact of the gas with the oil also absorbs oil vapors and carries them to the next higher chamber, and tends to still further heat the oil and cool the gas before passing into the next higher condenser heater. The liquid condensate in the cylinder 152 is withdrawn through a draw-off pipe 162. The temperature of the oil in the chamber may be observed by means of a thermometer inserted through a thermometer well 164.

Figure 6:
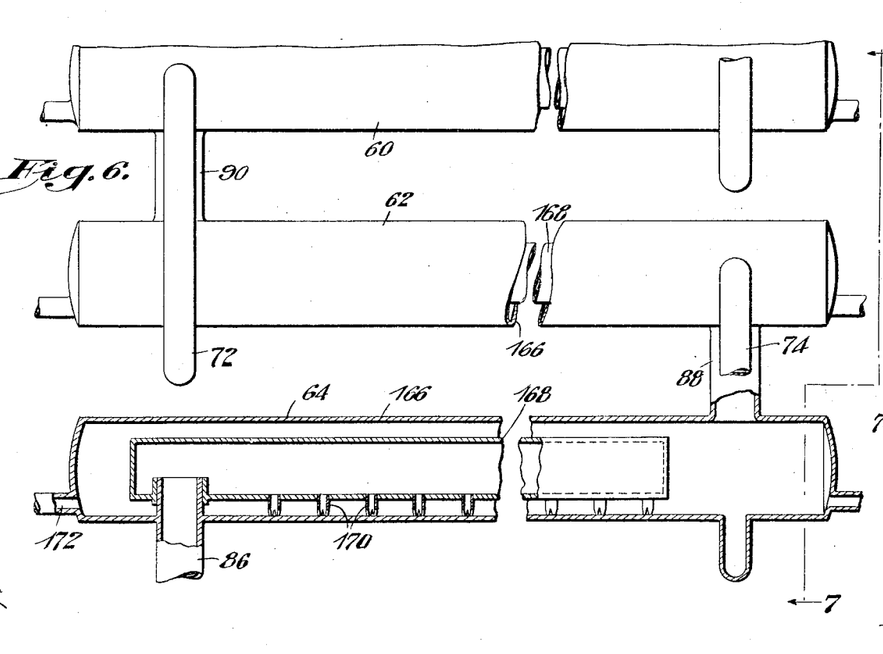
Fig. 6 is a front elevation, partly in section of heat recovery elements of the apparatus shown in Fig. 1.
Figure 7:
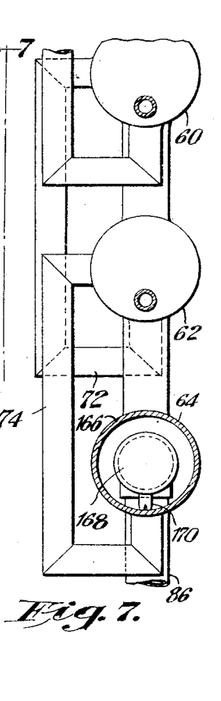
Fig. 7 is a side elevation, partly in section, of the heat recovery elements in Fig. 6.
Figure 8:
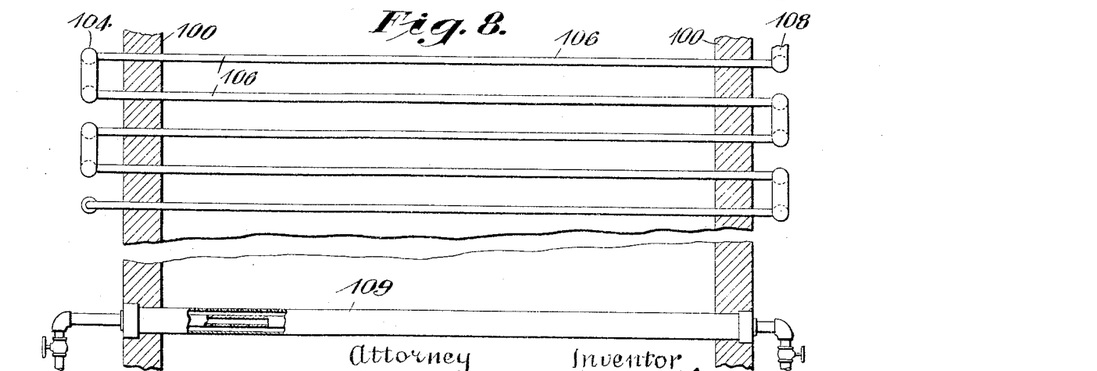
Fig. 8 is a detailed view of a gas heating furnace forming part of the apparatus shown in Fig. 1.

The construction of the heat transferring chambers 58 to 68 is illustrated in Figs. 6 and 7 of the drawings, and is somewhat similar to that of the fractionating chambers 18 to 34. Each heat transferring chamber comprises an outer cylindrical shell 166 which is partly filled with oil residues and an inner cylinder 168 into which the gas enters through an inlet pipe 86 passing through the outer shell 166. From the cylinder 168 the gas passes into the body of oil in the shell 166 through a number of short pipes 170 extending downwardly to the bottom of the shell 166 and provided with a number of notches at their lower ends. The gas entering the oil residues from the pipes 170 comes into intimate contact with the body of oil in the shell 166 and is thoroughly heated before passing out of the heat transferring chamber. The temperature of the oil in the heat transferring chamber may be observed by means of thermometers inserted through thermometer wells 172.

The condensates removed from the fractionating chambers 18 to 34 through the draw-off pipes 162 pass through traps 172 and through a series of water cooled tubes 174 to a draw-off pipe 176. Similarly, the condensates formed in the condenser coils 122 are withdrawn through a pipe 178, trap 180 and water cooled tube 182. The products obtained in this manner have definite boiling points ranging from that of the lightest, most volatile constituents condensed in the coil 122 and the uppermost condenser heater 18, to the heaviest hydrocarbons condensed in the lowermost condenser heaters 32 and 34. These various condensates may be combined to form products of any desired gravity or boiling points. Ordinarily the condensates from the lower fractionating chambers are returned to the apparatus when the apparatus is used for cracking hydrocarbon oils.

A very flexible and accurate control of the temperature conditions throughout the entire process may be obtained by the use of the above apparatus. This is particularly important in cracking oils, in which case the temperature at which the process is carried on is a very important, if not the controlling, factor in the formation of any desired product. In heating the oil in the cracking chamber, 54 for instance, the heating gas is divided up into a number of small bubbles uniformly distributed throughout the oil in such a manner that the transfer of heat from the gas to the surrounding oil is almost instantaneous and inasmuch as the bubbles are uniformly distributed throughout the oil, the heating is uniform throughout the entire chamber. The temperature may be very accurately and readily controlled regardless of the temperature of the gas by controlling the relative volumes of the gas and oil, and may be raised by increasing the rate of flow of the heated gas, or quickly decreased by shutting down the rate of flow of the gas for any given rate of flow of oil through the apparatus.

In the fractionating chambers, the mixture of vapors and gas is separated into a thin layer adjacent the walls of the tube 152 so that every portion of the gaseous mixture comes into proximity to the heat transferring wall. The wall of the tube 152 is maintained at substantially the temperature of the oil in its respective chamber by the agitating action of the upwardly passing bubbles of gas which continually bring fresh portions of oil adjacent the wall of the tube 152 and prevent the accumulation of heated volumes of oil on the outside of the tube. The action of the gas passing countercurrent to the flow of oil in connection with the effective heat transfer obtained, sweeps any lighter hydrocarbons in the downwardly passing oil upwardly through the apparatus and serves to prevent the entrance of any of the lighter hydrocarbons which may be suitable for blending in gasoline or other valuable products, from entering the cracking zone and being broken up into permanent gases.

Inasmuch as all of the heat contained in the oil leaving the cracking zone is recovered by the circulating gas and returned to the heating steps, the apparatus is very economical in its use of the heat taken up in the gas heating pipes.

Having described the preferred form of the invention, what is claimed as new is:

1. A liquid refining apparatus having in combination, a series of fractionating chambers arranged for gravity feed, a series of heat-transferring chambers arranged for gravity feed below said fractionating series, a connection for the flow of liquid between said fractionating series and said heat-transferring series, means to introduce the liquid to be treated into the upper chamber of the fractionating series, and means to circulate a fluid through the heat transferring chambers to absorb heat from the liquid as it advances through them, and means to circulate the heated fluid through the fractionating chambers countercurrent to the flow of the liquid therethrough.

2. A liquid refining apparatus having in combination, a series of fractionating chambers arranged for gravity feed, a series of heat-transferring chambers arranged for gravity feed below the fractionating series, a connection for the flow of fluid between the said fractionating series and said heat-transferring series, means to introduce the liquid to be treated into the upper chamber of the fractionating series, means to circulate a fluid through the heat transferring chambers to absorb heat from the liquid as it advances through them, means to circulate the heated fluid through the fractionating chambers countercurrent to the flow of the liquid therethrough, and means for separating condensates from vapors in chambers of the fractionating series.

3. A liquid refining apparatus having in combination a series of fractionating chambers arranged for gravity feed, means for introducing the liquid to be treated into the upper chamber of the series, means for withdrawing residual liquid from the last chamber of the series, means for introducing a heated fluid into the lowest chamber of the fractionating series and for circulating the heated fluid through the fractionating chambers countercurrent to the circulation of the liquid therethrough to progressively heat the liquid, and means for separating condensates from vapors in the chambers of the fractionating series.

4. A liquid refining apparatus having in combination, a series of liquid chambers arranged for gravity feed, means to introduce the liquid to be treated into the upper chamber of the series, means to withdraw residual liquid from the last chamber of the series, means to circulate in a closed cycle a gaseous heating medium through said chambers countercurrent to the flow of the liquid, and means for condensing from the gas, vapors removed from the liquid, and separately removing the same.

5. A liquid refining apparatus having in combination, a series of fractionating chambers connected for gravity feed, a series of heat-transferring chambers connected for gravity feed, a liquid-transferring connection between the said fractionating series and said heat-transferring series, means to introduce liquid into the first chamber of the fractionating series, means to withdraw liquid residuum from the last chamber of the heat-transferring series, means to circulate a gas through said chambers countercurrent to the liquid flow, and means to add heat to the gas as it flows from the heat-transferring series to the fractionating series.

6. A liquid refining apparatus having in combination, a series of fractionating chambers connected for gravity feed, a series of heat-transferring chambers connected for gravity feed, a connection for the transfer of liquid between the said fractionating series and said heat transferring series, means to introduce liquid into the first chamber of the fractionating series, means to withdraw liquid from the last chamber of the heat-transferring series, means to circulate gas through said chambers, and means to circulate said gas through a heater as it advances from the heat-transferring series to the fractionating series.

7. A liquid refining apparatus having in combination, a series of connected liquid fractionating chambers, a series of heat-transferring chambers, a connection for the flow of liquid from said fractionating series to said heat-transferring series, means for introducing liquid into the first chamber of the fractionating series, means for withdrawing liquid residuum from the last chamber of the heat transferring series, and means for circulating a gaseous heat-carrying medium through each of the chambers of the series countercurrent to the liquid flow.

8. A liquid refining apparatus having in combination, a series of separated liquid treating chambers arranged for gravity feed in succession, liquid-transferring means between the chambers arranged to maintain a body of liquid in each chamber, means for conducting a gas and vapor from each chamber to the next preceding chamber, means for passing a gaseous heating medium in a closed cycle through the series of chambers, said means comprising means for passing the heating medium through the liquid in each chamber, and means in the chambers for separately condensing vapors from vapors and liquids in said chambers.

9. A liquid refining apparatus having in combination, a series of separated liquid treating chambers arranged for gravity feed, liquid transferring means between said chambers arranged to maintain a body of liquid in each chamber, an elongated gas distributing tube mounted in each of the chambers, nozzles in said tubes for distributing gas within the chambers, said nozzles resting on the bottoms of the chambers and a conduit for the flow of gas from each of said chambers to the tube in the next preceding chamber.

10. A liquid refining apparatus having in combination a series of separated liquid treating chambers arranged for gravity feed, liquid transferring means between the chambers arranged to maintain a body of liquid in each chamber, a vapor condensing tube mounted in each of the chambers, a gas distributing tube mounted in each of said condensing tubes, means in said distributing tubes for distributing gas within said chambers, a gas passage between the condensing tube and the distributing tube in each chamber and a connection for conducting gas from each chamber to the condensing tube of the next preceding chamber.

11. A liquid refining apparatus having in combination, a series of separated chambers arranged for gravity feed in succession, an elongated gas-distributing tube mounted in each of the chambers, means for distributing gas from the tube through the liquid in the chamber in which the tube is located including pipes having slotted ends resting on the bottom of the chamber, a connection for gas between each chamber and the tube of the preceding chamber, and means for transferring liquid between succeeding chambers arranged to seal gas in one chamber for transfer into the tube of the preceding chamber.

12. A liquid refining apparatus having in combination, a series of separated chambers arranged for gravity feed in succession, a vapor-condensing tube mounted in each of the chambers, a gas-distributing tube mounted in each of said condensing tubes, means for transferring liquid between said chambers, a connection for gas transfer between each of the chambers and the condensing tube of the preceding adjacent chamber, means for distributing gas from the distributing tube into the interior of the chamber in which the distributing tube is located, and means for withdrawing the condensate from said condensing tubes.

13. A liquid refining apparatus having in combination a series of liquid fractionating chambers, a series of heat-transferring chambers, liquid-transferring means between said chambers, gas-transferring means between said chambers, means to introduce liquid into the first chamber of the fractionating series, means to withdraw liquid residuum from the last chamber of the heat-transferring series, a gas passage connected between said first and last chambers, means to circulate gas in a closed path through said chambers and passage, and means to add heat to said gas while it passes from the heat-transferring series to the fractionating series.

14. A liquid refining apparatus having in combination a series of liquid fractionating chambers, a series of heat-transferring chambers, liquid-transferring means between said chambers, gas-transferring means between said chambers, means to introduce liquid into the first chamber of the fractionating series, means to withdraw liquid residuum from the last chamber of the heat-transferring series, a gas passage connected between said first and last chambers, a vapor condenser in said passage, means to circulate gas in a closed path through said chambers and passage, and means to add heat to said gas while it passes from the heat-transferring series to the fractionating series.

15. A liquid refining apparatus having in combination a series of liquid fractionating chambers, a series of heat-transferring chambers, liquid-transferring means between said chambers, gas-transferring means between said chambers, means to introduce liquid into the first chamber of the fractionating series, means to withdraw liquid residuum from the last chamber of the heat-transferring series, a gas passage connected between said first and last chambers, means to circulate gas through said chambers and passage, means to add heat to said gas while it passes from the heat-transferring series to the fractionating series, and a distributor in each chamber for distributing gas throughout the body of liquid in the chamber.

16. A liquid refining apparatus having in combination a series of liquid fractionating chambers, a series of heat-transferring chambers, liquid transferring means between said chambers, gas-transferring means between said chambers, means to introduce liquid into the first chamber of the fractionating series, means to withdraw liquid residuum from the last chamber of the heat-transferring series, a gas passage connected between said first and last chambers, means to circulate gas in a closed path through said chambers and passage countercurrent to the flow of liquid, and means to separate vapors from the gas and liquid circuits in the fractionating chambers.

17. A liquid refining apparatus having in combination, a series of liquid treating chambers arranged for gravity feed, means to introduce liquid to be treated into the upper chamber of the series, means to withdraw liquid residuum from the last chamber of the series, a gas passage connected between said upper and last chambers, means to circulate gas in a closed path through said passage and chambers, and means for separating from said gas, vapors removed from the liquid.

18. A liquid refining apparatus having in combination a series of liquid treating chambers arranged for gravity feed, means for introducing liquid to be treated into the upper chamber of the series, means to withdraw liquid residuum from the last chamber of the series, a gas passage connected between said upper and last chambers, means to circulate gas in a closed path through said passage and chambers, and means mounted within some of said chambers for separating from said gas, vapors removed from the liquid by the gas.

19. A liquid refining apparatus having in combination a series of liquid treating chambers arranged for gravity feed, means to introduce liquid to be treated into the upper chamber of the series, means for withdrawing liquid residuum from the last chamber of the series, a gas passage connected between said upper and last chambers, means to circulate gas in a closed path through said passage and chambers, and means mounted within said chambers and in said passage for separating from the gas, vapors removed from the liquid by the gas.

20. A liquid refining apparatus having in combination a series of separated liquid treating chambers and liquid transferring means connecting said chambers, said chambers comprising elongated cylindrical tubes, a cylindrical vapor-condensing tube mounted within each chamber and having a diameter adapted to provide a comparatively narrow space between the inner walls of the chamber tube and the outer walls of the condensing tube, a cylindrical gas distributing tube mounted within each condensing tube, nozzles on said distributing tubes extending into the lower portion of said chamber tubes and sealed from said condensing tubes, a conduit for the flow of gas from each condensing tube to the distributing tube mounted therein arranged to prevent the entrance of condensate into said distributing tube and a conduit for the flow of gas from each chamber tube into the condensing tube mounted in the next preceding chamber.

21. A liquid refining apparatus having in combination a series of liquid treating chambers arranged for gravity feed, means to introduce the liquid to be treated into the upper chamber of the series, means to withdraw residual liquid from the last chamber of the series, means to circulate in a closed cycle a gaseous heating medium through said chambers countercurrent to the flow of liquid, means for separating from the gas, vapors removed from the liquid, and a foam separator connected with said upper chamber for the treatment of said gas.

22. A liquid refining apparatus having in combination, a series of separated liquid treating chambers and liquid-transferring means between said chambers, said chambers comprising elongated cylindrical tubes, elongated cylindrical gas-distributing tubes mounted within said chamber tubes, and a conduit for conducting gas from each chamber tube into the distributing tube mounted in the next preceding chamber tube, said conduit including a casing surrounding said distributing tube.

23. A liquid refining apparatus having in combination a series of separated liquid treating chambers and liquid-transferring means between said chambers, said chambers comprising elongated cylindrical tubes, cylindrical vapor-condensing tubes mounted within said chamber tubes and having a diameter which will provide a comparatively narrow space between the inner walls of the chamber tubes and the outer walls of the condensing tubes, a passage for gas from the inside of each condensing tube into said space in each chamber arranged to prevent the flow of liquid condensate from the condenser into said chamber tube, and a conduit for the flow of gas from each chamber tube to the condensing tube mounted in the next preceding chamber.

24. An apparatus for carrying out the process described, comprising a series of containers, means for passing liquid into the first container and thence progressively through the other containers, means for intimately and profoundly agitating the liquid in each container, a heater for the last container, and a vapor conduit from the last container passing through the remaining containers back to the first of the series, and means for removing condensates in various portions of said vapor conduit.

25. A liquid petroleum cracking apparatus having in combination a series of separate tubular chambers closed for operation under pressure and connected to permit feed by gravity from the upper to the lower chamber, means for conducting a heating gas through the chambers countercurrent to the flow of the liquid therethrough, a heat interchanging unit connected with the lowermost chamber of the cracking chamber series having connections for circulating the heating gas therethrough to extract heat from residual oil passing through the heat interchanger unit, a heater, connections for circulating the gas from the heat interchanger unit through the heater and introducing it into the lower chamber of the cracking chamber series, means for returning gases from the upper chamber of the cracking series to the heat interchanger unit and means for separating a vapor fraction from the vapors passing through the cracking chamber series.

26. In an apparatus of the class described, a series of stills, means for maintaining the stills of the series at successively higher temperatures, means for feeding oil into the first still of the series and for conveying oil from each of said stills to the next succeeding still of the series, means for conveying vapors from each still, except the first, and discharging them into the next preceding still of the series, and means for condensing part of the vapors so conveyed comprising means for bringing them in heat exchanging relation with condensate thereof formed in said next preceding still.

27. A liquid refining apparatus comprising a series of liquid distilling chambers, means for maintaining the chambers at successively higher temperatures, means for feeding oil to the first chamber and from each chamber to the next in the series, a condenser mounted in each chamber, said condenser being adapted to be cooled by the oil therein, means for conducting vapors from each chamber, except the first and discharging them into the condenser mounted in the next preceding chamber and means for passing the vapors remaining uncondensed in each condenser into the oil in the chamber in which said condenser is mounted.

28. A distilling apparatus comprising a series of narrow elongated heated stills, means for passing oil through each still, a distributor in each still for injecting vapor into the oil at a plurality of points along its passage therethrough, means for condensing and isolating as condensate a portion of the vapors evolved from the oil, in each still means for conducting the uncondensed portion of the vapors from each still, except the first, to the distributor of the next preceding still and means for conducting vapor to the distributor of the last still.

29. An apparatus for cracking petroleum oil constituents comprising a gas heater adapted to heat a gas to a relatively high temperature, a cracking reaction chamber separate from said heater and a combined heat exchanger and vaporizer, means for conducting oil to be treated into said vaporizer and for conducting a portion of the oil constituents from said vaporizer into said reaction chamber, means for passing a heat carrier gas into said heater to be heated therein to a high temperature and for conducting the resulting heated gas into said reaction chamber, means for intimately contacting said heated gas with the oil constituents in said reaction chamber to thereby heat and crack said constituents, means for conducting gas and vapor products from said chamber into said combined heat exchanger and vaporizer in heat exchange with the oil introduced thereinto to thereby vaporize portions of the oil, a condenser for condensing readily condensible constituents from the said gas and vapor products, and means for conducting resulting separated gas into said gas heater.

In testimony whereof I affix my signature.

HENRY L. DOHERTY.